JOSHUA KIDD.
*Apparatus for Generating Gas.*
4168
Reissued Oct 25 1870
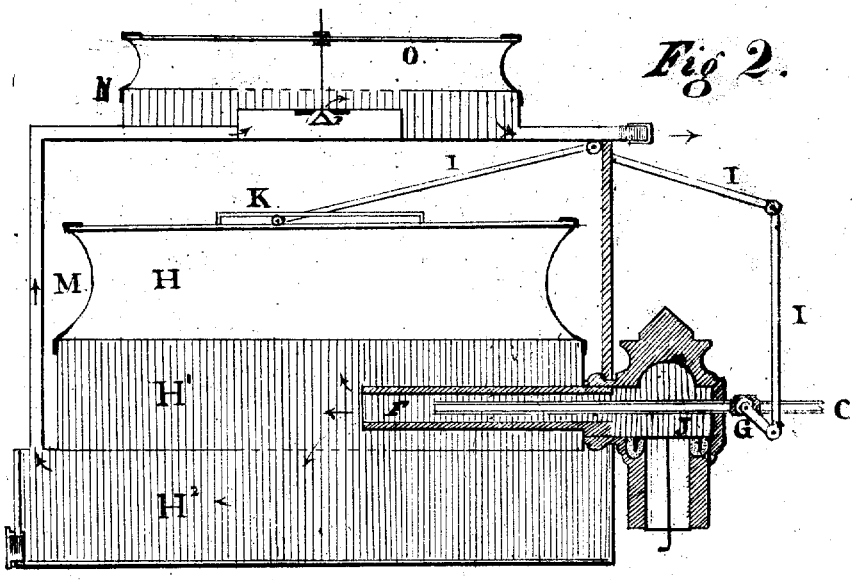
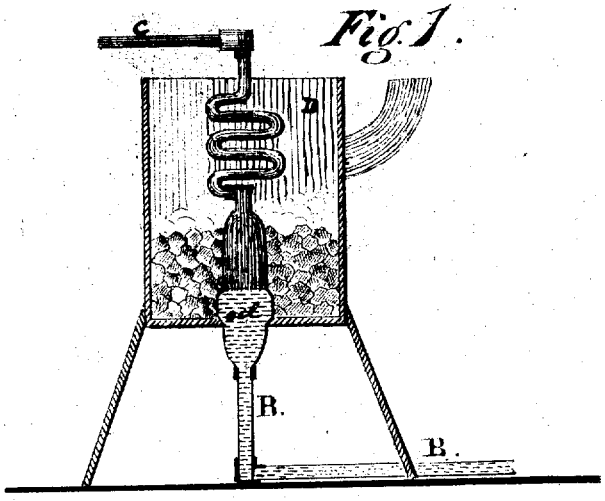
Witnesses
G Earl Washburn
George Parker
Inventor
Joshua Kidd

UNITED STATES PATENT OFFICE.

JOSHUA KIDD, OF NEW YORK, N. Y.

IMPROVEMENT IN THE MANUFACTURE OF GAS FROM HYDROCARBONS.

Specification forming part of Letters Patent No. 106,[illegible], dated August 23, 1870; Reissue No. 4,168, dated October 25, 1870.

*To all whom it may concern:*

Be it known that I, JOSHUA KIDD, of the city, county, and State of New York, have invented a new and Improved Apparatus for Generating Gas for Lighting and Heating Purposes; and I do hereby declare that the following is an exact description thereof, which will enable others skilled in the art to make and use the same, reference being had to the drawings hereunto annexed, and making a part of this specification.

Figure 1 is a central vertical section of retort and fire-box. Fig. 2 is a similar section of a gas-measuring chamber and governor for regulating the supply of gas to the burners.

My improvements consist in generating gas or vapor for a number of burners automatically by heating the oil from or at the top of its vertical column in a retort made perpendicular, or nearly so. The liquid enters the retort from a supply-tank at its lowest part, and is evaporated without any mechanical disturbance of its composition.

Petroleum, naphtha, or gasoline is composed of several chemical compounds having different boiling-points, and when evaporated in a boiler or still with the heat applied under a considerable body of the liquid the lightest portion of the oil will fly off first, leaving a liquid which, when vaporized and forced through gas-pipes, will have a great tendency to condensation. My improvements are intended to remedy this evil, and when gas or vapor is generated by my improved method the vapor is equally combined with the constituent parts of the oil having different boiling-points, and when mixed with a given quantity of air it has all the characteristics of a permanent gas.

To make the supply of gas to the burners automatic, I place between the burners and the retort a gas-regulator, the construction of which is well known, consisting of a disk and valve balanced on the pressure of the gas. However the pressure of the gas or vapor may vary in the retort this regulator will maintain an unvarying pressure at the burners, and as the consumption is reduced the liquid will be driven farther away from the heated part of the retort to the supply-tank, and as the consumption of gas is increased the regulator will automatically lessen the pressure in the retort and allow the oil to return from the tank and rise to a hotter part of the retort, where the required amount of gas or vapor will be generated to supply the number of burners.

It is an essential part of my invention that a free channel exist for the passage of the liquid to and through between the retort and the supply-tank. The required pressure may be placed upon the liquid in the tank by compressed air, or the tank may be elevated, so that the falling column of liquid will give the required pressure.

I am aware that self-generating vapor-lamps have been made where the oil has been allowed to fall down a small tube from an elevated reservoir, and after passing through an adjustable cock it rises up a tube bent over the flame, and is there vaporized. The light in this kind of lamp is increased or diminished by allowing more or less oil to flow into the heated tube by opening or closing the cock; but my method of heating the oil has never before been applied to a gas-machine for manufacturing gas for a number of burners, where the gas or vapor generated adjusts itself automatically to the supply of the burners only in actual use, and entirely dispenses with the use of a gas-holder. The gas or vapor by being retained in the retort under pressure becomes more elastic and superheated by the heat surrounding the retort, and on this account, when mixed with air, has less tendency to condensation. This method of generating gas or vapor I patented in England, and the same is described in specification No. 33, January 5, 1864. I patented other improvements in England in this method of generating gas, dated February 17, 1866, number of specification 513, which consists in various devices for mixing the gas thus generated with atmospheric air—namely, by means of an ordinary wet-meter drum actuated by a weight or by an induced current of air caused by the escaping force of a jet of vapor; but I lay no special claim to those devices as new, but when using the jet of vapor to induce a current of air I pass the same into a meter with the registering-wheels dispensed with. This meter I patented in England, July 9, 1862, No. 1,955. This meter consists of a measuring-chamber combined with a gas-regulator.

The bellows or measuring-chamber of this meter takes in a given quantity of gas, and when full overturns a mercury balance, which balance presses on the valve and instantly closes it. When the bellows has emptied itself through the gas-regulator the mercury balance is again acted upon and overturned, and falling on the opposite end of the valve or cock opens it. This balance is formed by half-filling a metal tube with mercury and attaching it to the cock or valve admitting the vapor. When mixing air with gas or vapor generated by my improved method by means of a wet-meter drum or pump I simply pass the air and gas through a regulator, (shown at N, Fig. 2,) and dispense with the measuring-chamber and compartments H, H′, and H²; but whatever method is adopted for mixing the vapor with air the combination of the regulator with the retort is indispensable, and forms one of the chief features of my invention.

Fig. 1, A shows the retort with an outlet at the top and an inlet or feed pipe, B B, at the bottom. The feed-pipe is connected to the supply tank or reservoir. The gas generated, after leaving the retort, passes through measuring-chamber H′ and gas-regulator N. When the burners are turned off the pressure in retort drives the liquid away from the heated parts thereof and gas ceases to be generated. As the burners are opened the pressure is lessened in the retort, the oil rises, and generates gas for the burners in use only.

D shows the fire-box. C C show the gas-outlet pipe. When vapor only is required this pipe can be formed straight from the retort, and made to terminate in a larger pipe, F, (shown at Fig. 2;) but when a permanent gas is required it is necessary to heat this pipe red hot, and increase its heating-surface by making the pipe in a worm-like form. When the bellows H falls it actuates the levers I I I and opens the cock G, and the escaping force of the gass or vapor lifts the air-valve J, and induces or draws a current of air with it, which air mixes with the gas or vapor entering the measuring-chamber H′, as the bellows H rises it closes the cock G by suddenly overturning a mercury balance fixed on a center attached to the bearing of the cock. This balance is not shown in the drawings. The suction thus being removed from the air-valve J, it closes and seals itself by falling into a circular channel, L, partly filled with mercury. K are wire slots in which a wire cross-bar attached to levers I I I slides.

H² is a well or receptacle for condensation, which is drawn off at plug H³; M, gas-pipe leading from measuring-chamber to regulator; N, gas-regulator composed of a disk, O, and valve P, which is balanced on the pressure of gas.

The bellows of regulator N and measuring-chamber H may be made like the bellows of an ordinary gas-meter, if required.

When vapor only is required the retort may be mode of copper and heated by one or more gas-jets from the apparatus.

When water is evaporated in the retort instead of oil this apparatus may be used for inducing a current of air for heating and ventilating purposes.

I claim—

1. The method described of constructing an automatic apparatus for generating gas or vapor for a number of burners by heating the oil from or at the top of its vertical column under pressure in a retort made vertical, or nearly so, and having its supply-pipe at the bottom, and arranged without any stop-cock between the retort and the supply-tank for adjusting the supply of oil to be vaporized, so that the body or supply of oil may be balanced and freely oscillated between the pressure in the retort and the pressure on the liquid in the supply-tank.

2. The combination of a gas-regulator with a retort having an outlet at the top and an inlet at the bottom, substantially as described.

3. A retort made vertical, or nearly so, for generating gas or vapor automatically, having its outlet at the top and its feed-pipe connected and open from its lowest part to the supply-tank, so that when the pressure increases in the retort it will drive the liquid back to the tank, and vice versa.

JOSHUA KIDD.

Witnesses:
GEORGE TAYLOR,
GEO. EARL WASHBURN.